(12) United States Patent
Moon et al.

(10) Patent No.: US 9,504,121 B2
(45) Date of Patent: Nov. 22, 2016

(54) SYSTEM AND METHOD FOR PROVIDING SURGE PROTECTION FOR AN AC DIRECT STEP DRIVER LIGHTING SYSTEM

(71) Applicant: Altoran Chips & Systems, Santa Clara, CA (US)

(72) Inventors: Kyeongtae Moon, San Ramon, CA (US); Jae Hong Jeong, Saratoga, CA (US); Minjong Kim, San Jose, CA (US); Weifeng Chen, San Jose, CA (US); Juhwan Jeong, Suwon (KR); Gyehyun Cho, Incheon (KR); Jongho Kim, Yongin (KR)

(73) Assignee: Altoran Chips & Systems, Santa Clara, CA (US)

( * ) Notice: Subject to any disclaimer, the term of this patent is extended or adjusted under 35 U.S.C. 154(b) by 0 days.

(21) Appl. No.: 14/605,998

(22) Filed: Jan. 26, 2015

(65) Prior Publication Data

US 2016/0050724 A1    Feb. 18, 2016

Related U.S. Application Data

(60) Provisional application No. 61/931,558, filed on Jan. 24, 2014.

(51) Int. Cl.
*H05B 37/02* (2006.01)
*H05B 33/08* (2006.01)

(52) U.S. Cl.
CPC .......... *H05B 33/089* (2013.01); *H05B 33/083* (2013.01); *H05B 33/0809* (2013.01); *Y02B 20/341* (2013.01); *Y02B 20/345* (2013.01)

(58) Field of Classification Search
CPC ............ H05B 33/089; H05B 33/0809; H05B 33/0845
USPC ...................... 315/200 R, 224, 299
See application file for complete search history.

(56) References Cited

U.S. PATENT DOCUMENTS

| | | | | |
|---|---|---|---|---|
| 2007/0267984 A1* | 11/2007 | Peng | .................. | H05B 33/0803 315/312 |
| 2008/0278092 A1* | 11/2008 | Lys | .................... | H05B 33/0815 315/247 |
| 2011/0080105 A1* | 4/2011 | Mayer | .................... | H05B 37/02 315/250 |
| 2013/0049589 A1* | 2/2013 | Simi | .................. | H05B 33/0815 315/85 |
| 2013/0249437 A1* | 9/2013 | Wang | ................. | H05B 33/0815 315/307 |

* cited by examiner

*Primary Examiner* — Daniel D Chang

(57) ABSTRACT

An AC direct driver lighting system including a surge protection circuit and a current limiting circuit is disclosed. According to one embodiment, the AC direct driver lighting system includes an LED load, a rectifier, and an LED driver configured to receive rectified AC voltage from an AC power source and drive the LED load. The AC direct driver lighting system further includes a surge protection circuit and a current limiting circuit disposed between the AC power source and the LED load. The surge protection circuit and the current limiting circuit suppress excessive current flowing through the AC direct driver lighting system.

24 Claims, 9 Drawing Sheets

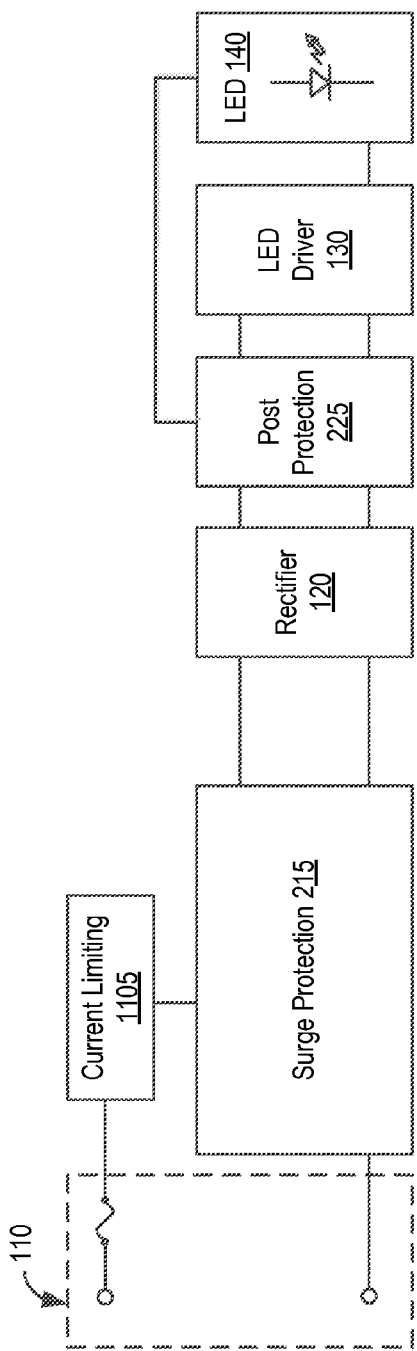
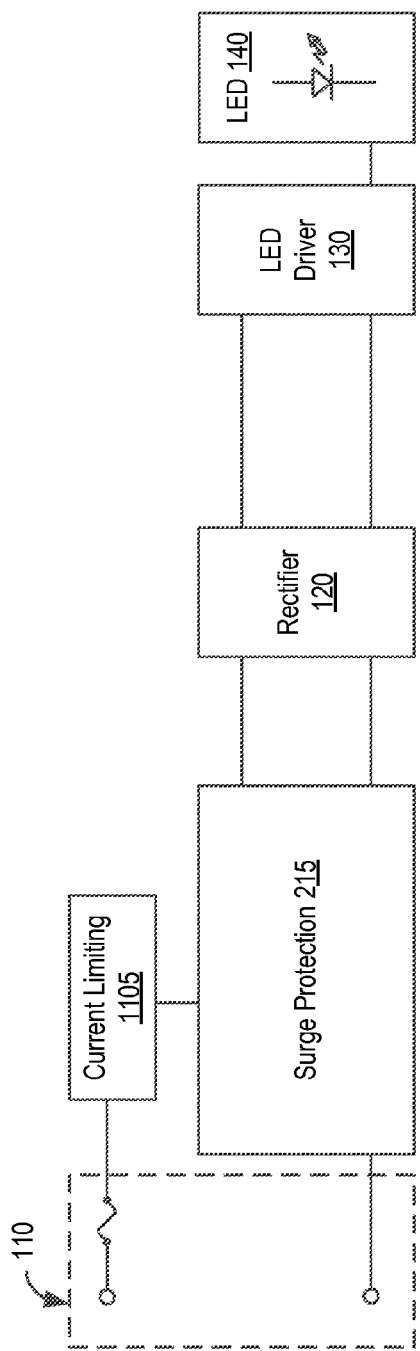

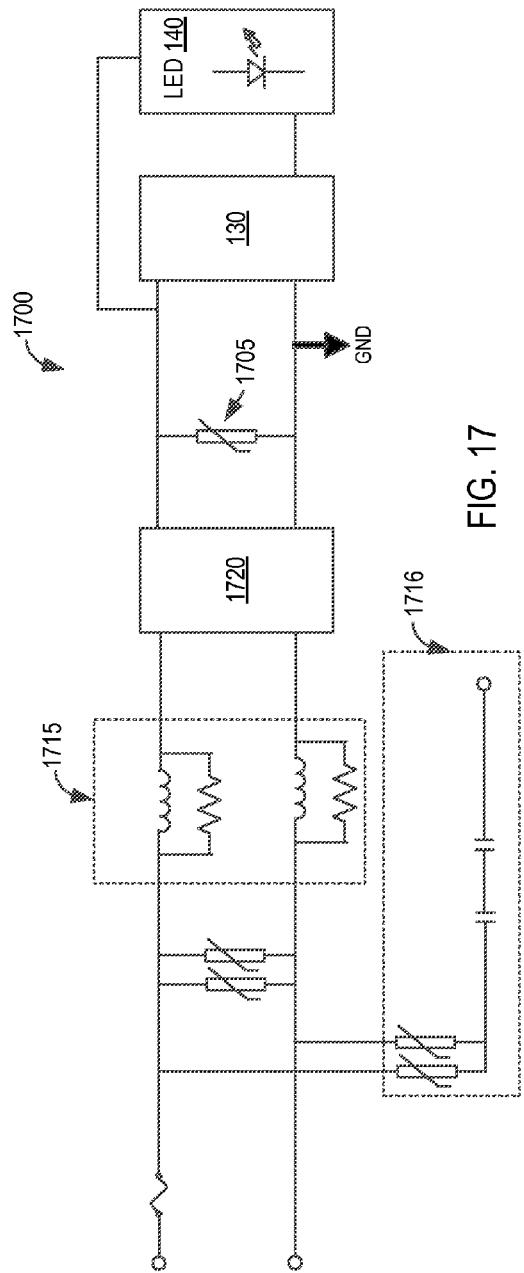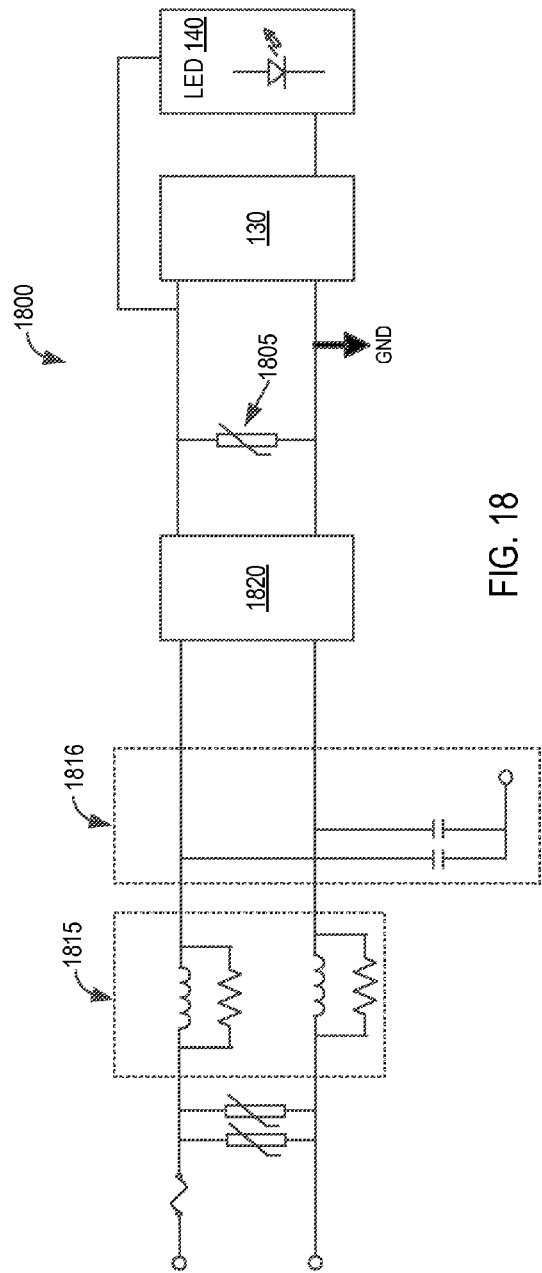

SYSTEM AND METHOD FOR PROVIDING SURGE PROTECTION FOR AN AC DIRECT STEP DRIVER LIGHTING SYSTEM

CROSS REFERENCES

This application claims the benefits of and priority to U.S. Provisional Application No. 61/931,558, filed on Jan. 24, 2014, entitled "New Surge Protection Scheme for AC Direct Step Driver Lighting System," the disclosure of which is hereby incorporated by reference in its entirety.

FIELD

The present disclosure relates in general to the field of alternative current (AC) lighting systems, and in particular, to a system and method for providing surge protection for an AC direct step driver lighting system.

BACKGROUND

An alternating current (AC) lighting system refers to a system that directly drives a lighting load such as a light emitting diode (LED), an organic light emitting diode (OLED), or other light emitting devices or components using rectified AC line voltage from an AC power source. AC lighting systems eliminate the need of a power conversion unit that converts electrical power from an AC power source to a direct current (DC) power source. Due to their simple design and less components, AC lighting systems provide a low-cost solution for residential or commercial applications receiving and utilizing electrical power directly from an AC power source.

A surge refers to a dramatic increase of voltage for a short period of time (e.g., up to 50 microseconds). If a surge is high enough and lasts long enough, components can heat and burn. Surges can damage electronic circuits and shorten their service life. Surges can be classified as external or internal. While external surges (caused by storms and normal power company switching operations) are generally more severe, internal surges generally occur more frequently, for example, when equipment is cycling on and off. Surges can cause all types of problems, ranging from soft errors where information is scrambled in computing systems to gradual circuit deterioration resulting in premature failure and intermittent operation to outright destruction of circuits. Surges can over time wear out delicate circuits, causing intermittent problems and slowing down the operation of a system.

An AC direct step driver lighting system that is directly connected to an AC power source (e.g., 120/220 VAC) can be damaged by a short circuit or by an overload condition caused by a failure of components and/or circuits inside the AC direct step driver lighting system. In addition, a lightning surge or load switching transient that originates outside the AC direct step driver lighting system can create a voltage or current spike that can stress and damage components and circuits of the lighting system ultimately rendering the entire lighting system non-operational.

SUMMARY

An AC direct driver lighting system including a surge protection circuit and a current limiting circuit is disclosed. According to one embodiment, the AC direct driver lighting system includes an LED load, a rectifier, and an LED driver configured to receive rectified AC voltage from an AC power source and drive the LED load. The AC direct driver lighting system further includes a surge protection circuit and a current limiting circuit disposed between the AC power source and the LED load. The surge protection circuit and the current limiting circuit suppress excessive current flowing through the AC direct driver lighting system.

The above and other preferred features, including various novel details of implementation and combination of events, will now be more particularly described with reference to the accompanying figures and pointed out in the claims. It will be understood that the particular systems and methods described herein are shown by way of illustration only and not as limitations. As will be understood by those skilled in the art, the principles and features described herein may be employed in various and numerous embodiments without departing from the scope of the present disclosure.

BRIEF DESCRIPTION OF THE DRAWINGS

The accompanying drawings, which are included as part of the present specification, illustrate the presently preferred embodiment and together with the general description given above and the detailed description of the preferred embodiment given below serve to explain and teach the principles described herein.

FIG. 11 illustrates an exemplary surge protection scheme implemented in an AC direct step driver lighting system, according to one embodiment;

FIG. 12 illustrates another exemplary surge protection scheme implemented in an AC direct step driver lighting system, according to one embodiment;

FIGS. 14-18 illustrate other exemplary of surge protection circuits implemented in an AC direct step driver lighting system, according to one embodiment.

Figure 1:
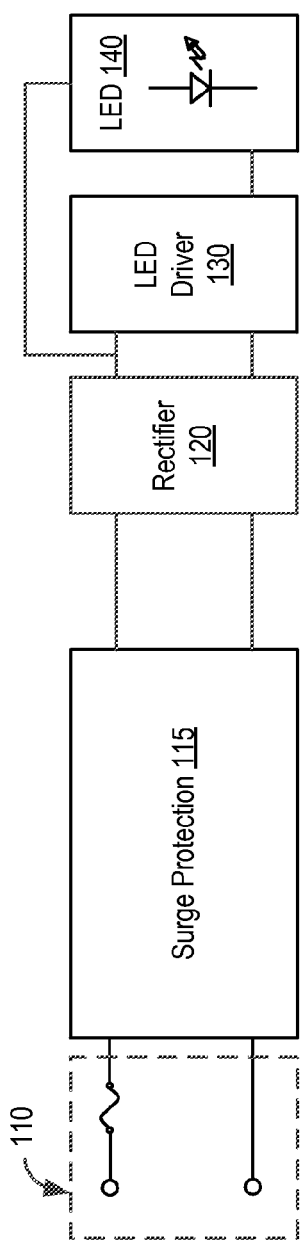
FIG. 1 shows a prior art surge protection scheme for an AC direct step driver lighting system.

The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims.

DETAILED DESCRIPTION

An AC direct driver lighting system including a surge protection circuit and a current limiting circuit is disclosed. According to one embodiment, the AC direct driver lighting system includes an LED load, a rectifier, and an LED driver configured to receive rectified AC voltage from an AC power source and drive the LED load. The AC direct driver lighting system further includes a surge protection circuit and a current limiting circuit disposed between the AC power source and the LED load. The surge protection circuit and the current limiting circuit suppress excessive current flowing through the AC direct driver lighting system.

Each of the features and teachings disclosed herein can be utilized separately or in conjunction with other features and teachings to provide a method for providing an AC light system with a control unit for controlling power of an LED. Representative examples utilizing many of these additional features and teachings, both separately and in combination, are described in further detail with reference to the attached drawings. This detailed description is merely intended to teach a person of skill in the art further details for practicing preferred aspects of the present teachings and is not intended to limit the scope of the claims. Therefore, combinations of features disclosed in the following detailed description may not be necessary to practice the teachings in the broadest sense, and are instead taught merely to describe particularly representative examples of the present teachings.

In the following description, for purposes of explanation only, specific nomenclature is set forth to provide a thorough understanding of the present invention. However, it will be apparent to one skilled in the art that these specific details are not required to practice the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

The present disclosure provides a system for surge protection for an AC direct step lighting system and a method providing therefor. In one embodiment, the present AC direct step lighting system includes a current limiting circuit that limits an injection current and voltage into an internal chip or a device preventing the AC direct step lighting system from damage and providing safety to lightning surges or load switching transient.

FIG. 1 shows a prior art surge protection scheme for an AC direct step driver lighting system. The AC direct step driver lighting system includes a surge protection circuit 115, a rectifier circuit 120, and an LED driver 130. The rectifier circuit 120 is disposed between the AC power source 110 and the LED driver 130 that drives the LED load 140. The LED driver 130 is powered by an alternative current (AC) power source 110 including a fuse and a transient protection circuit between a live wire (AC_L) and a neutral wire (AC_N). The electrical current from the AC power source 110 is rectified by the rectifier circuit 120. The rectifier circuit 120 can be any suitable rectifier circuit, such as a bridge diode rectifier, capable of rectifying the alternating power from the AC power source 110. The rectified voltage Vrect is applied to the LED load 140.

When a voltage spike is forced into the AC power line, the surge protection circuit 115 clamp or shunt electrical currents caused by the voltage spike toward the rectifier circuit 120, the LED driver 130, and the LED load 140. The voltage and/or current spike may be caused by a lightning surge or load switching transient.

Figure 2:
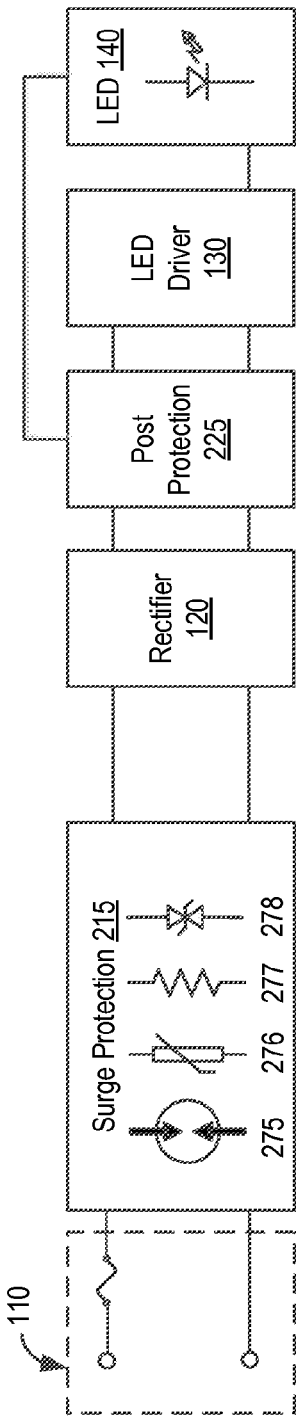
FIG. 2 shows an exemplary AC direct step driver lighting system including a post protection circuit, according to one embodiment.

FIG. 2 shows an exemplary AC direct step driver lighting system including a post protection circuit, according to one embodiment. The rectifier circuit 120 is disposed between the AC power source 110 and the LED driver 130 that drives the LED load 140. When the voltage surge is beyond the level of surge protection rated for the surge protection circuit 215 or the electrical components used in the surge protection circuit 215 do not have sufficient protective characteristics, some amount of residual voltage and/or residual current may be introduced to the LED driver 130 and the LED load 140.

The surge protection circuit 215 may include various types of components, including, but not limited to, a gas discharge tube 275, a metal oxide varistor (MOV) 276, a resistor 277, and a transient-voltage-suppression (TVS) diode 278, or any combination thereof. A varistor has an electrical resistivity that varies with an applied voltage. A gas discharge tube has an arrangement of electrodes in a gas within an insulating, temperature-resistant tube. A gas discharge tube exploits electric discharge in gases by ionizing the gas with an applied voltage sufficient to cause electrical conduction, thus limiting voltage surges in electrical and electronic circuits. The TVS diode shunts excess current when an induced voltage exceeds a breakdown voltage and suppresses over voltages above the breakdown voltage. A transient-voltage-suppression diode may be either unidirectional or bidirectional. A symbol for a unidirectional transient-voltage-suppression diode is used in the following examples, however it is apparent that bidirectional transient-voltage-suppression diode may be used where the unidirectional transient-voltage suppression diode is used without deviating from the present disclosure.

The post protection circuit 225 clamps the residual voltage out of the surge protection circuit 215. In one embodiment, the post protection circuit 225 suppresses the residual current in parallel with the surge protection circuit 215. The post protection circuit 225 may include various types of components, including, but not limited to, a gas discharge tube, a metal oxide varistor (MOV), a resistor, and a transient-voltage-suppression (TVS) diode, or any combination thereof.

LED as used herein are a general term for many different kinds of LEDs, such as traditional LED, super-bright LED, high brightness LED, organic LED, etc. The LED driver 130 is configured to drive many different kinds of LEDs. The LED load 140 is electrically connected to the LED driver 130 is in the form of a string of LEDs divided into a plurality of LED groups. However, it should be apparent to those of ordinary skill in the art that the LED load 140 may contain any number of LED groups and LED elements (or LED dies) in each LED group, and may be divided into any suitable number of groups without deviating from the scope of the present subject matter. The LED elements in each LED group may be a combination of the same or different kind, such as different color. The LED load 140 can be connected in serial, parallel, or a mixture of both. In addition, one or more resistances may be included inside each LED group.

The LED driver 130 controls the LED current that flows through the LED load 140. According to one embodiment, the LED driver 130 is a direct AC step driver ACS0804 or ACS0904 by Altoran Chips and Systems of Santa Clara, Calif. The LED driver 130 integrates a plurality of high voltage current sinks, and each high voltage current sink drives each LED group. When the rectified voltage, Vrect, reaches a reference voltage Vf, the LED groups in the LED load 140 turn on gradually when the corresponding current sink has a headroom. Each LED channel current sink increases up to a predefined current level for each current sink and maintains its level until the following group's current sink reaches to its headroom. When the active LED group is changed from one group to the adjacent group with a change in the rectified voltage, Vrect, new active group's current gradually increases while the existing active group's current gradually decreases. The mutual compensation between LED groups achieves a smooth LED current change reduces blinking or flickering. However, light distribution across different the LED groups may not be uniform.

Figure 3:
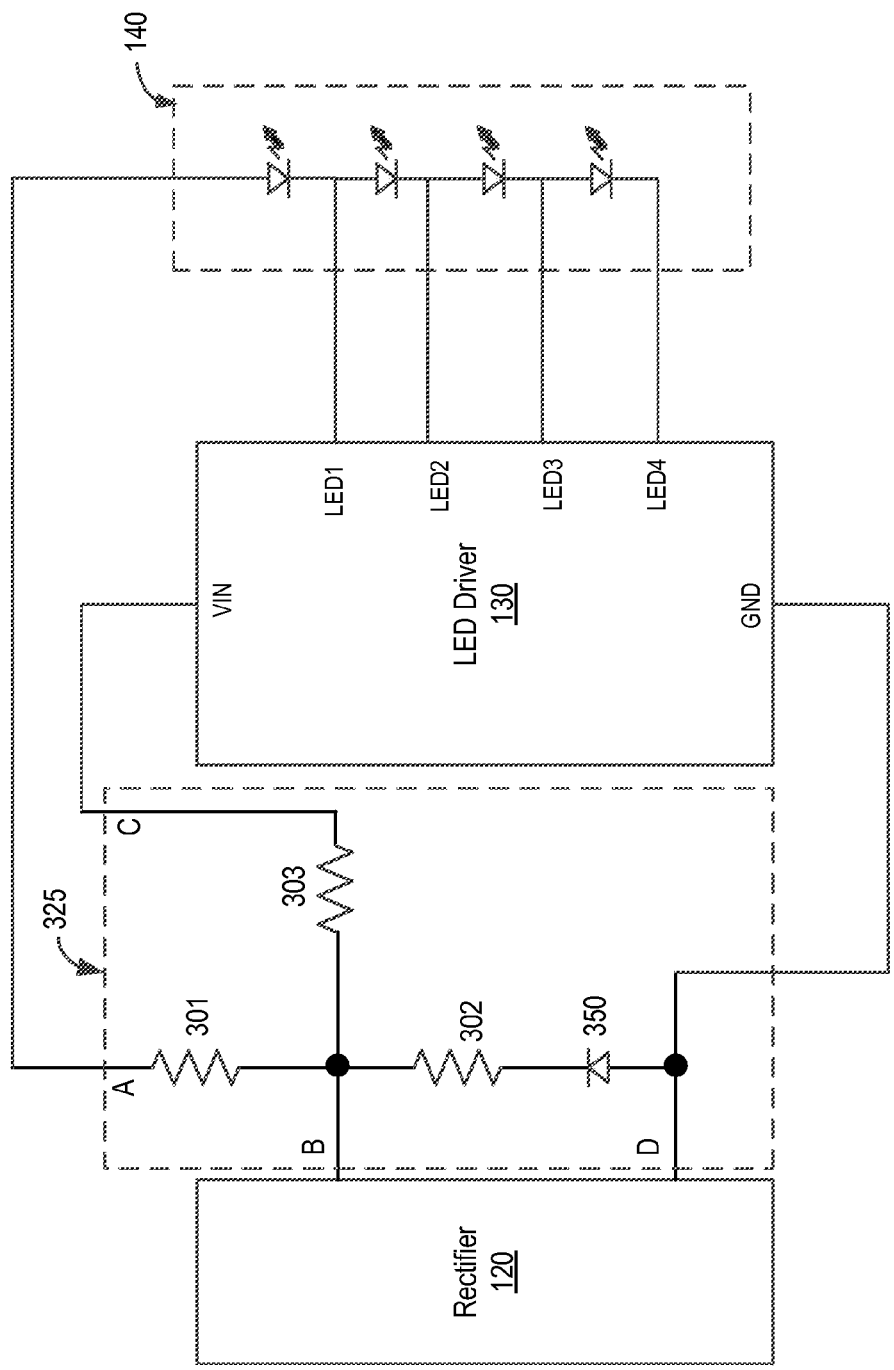
FIG. 3 illustrates an exemplary post protection circuit implemented in AC direct step driver lighting system, according to one embodiment.

FIG. 3 illustrates an exemplary post protection circuit implemented in AC direct step driver lighting system, according to one embodiment. A post protection circuit 325 is disposed between a rectifier 120 and an LED driver 130 that drives an LED load 140. The LED driver 130 has several input pins including, but not limited to, a voltage input VIN and a ground GND. The LED driver 130 further has four pins LED1-LED4 (also refers to LED channel output) to connect to and drive four LED groups of the LED load 140. The LED channel output pins are connected to the bottom cathode(s) of each LED group. It is apparent that the LED driver 130 may include any number of LED channel output pins without deviating from the scope of the present disclosure. The post protection circuit 325 suppresses the voltage surges that may appear on the voltage input to the LED driver 130 and/or the LED load 140. The post protection circuit 325 includes resistors 301-303 and a transient voltage suppression (TVS) diode 350. The resistor 301 reduces voltage surges appearing on the voltage input (A) to the LED load 140 whereas the resistor 303 reduces the voltage surges appearing on the voltage input (C) to the LED driver 130. The resistor 302 and the TVS diode 350 are connected in series between the rectified voltage out (B) from the rectifier 120 and the ground (D).

Figure 4:
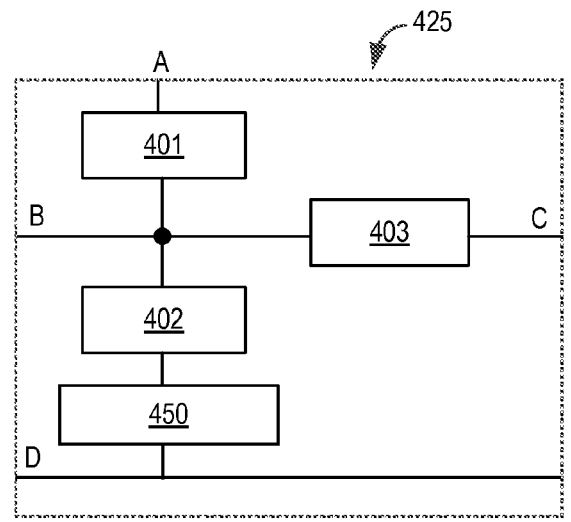
FIG. 4 illustrates another exemplary post protection circuit implemented in AC direct step driver lighting system, according to one embodiment.

FIG. 4 illustrates another exemplary post protection circuit implemented in AC direct step driver lighting system, according to one embodiment. The post protection circuit 425 includes current limiting circuits 401-403 and a surge protection component 450. The current limiting circuit 401 reduces voltage surges appearing on the voltage input (A) to an LED load (not shown) whereas the current limiting circuit 403 reduces the voltage surges appearing on the voltage input (C) to an LED driver (not shown). The current limiting circuit 402 and the post protection component 450 are connected in series between the rectified voltage out (B) from a rectifier (not shown) and the ground (D). Similar to the example shown in FIG. 3, the post protection circuit 425 is disposed between the rectifier and an LED driver and/or an LED load. The post protection circuit 425 provides voltage clamping, and limits excessive current that may flow on the rectified voltage out of the rectifier and damage the downstream the LED driver and the LED load. The current limiting circuits 401-403 may include any combination and/or any number of resistors, inductors, and diodes, and any other current limiting circuits and/or devices. Examples of current limiting circuits are shown in FIGS. 13A-13F.

In one embodiment, the surge protection component 450 and the current limiting circuits 401-403 divert unwanted surge energy away from the LED load, through a protective component connected in a parallel (or shunted) topology. In another embodiment, the surge protection component 450 and the current limiting circuits block unwanted energy by using a protective component connected in series with the power feed to the LED load, and may additionally shunt the unwanted energy. Various configurations and connections of the current limiting circuits 401-403 and/or the surge protection component 450 can be used depending on the level of surge protection and the level of the AC voltage. The examples shown in FIGS. 5-10 illustrate various current limiting circuits implemented in an AC direct drive lighting system.

Figure 5:
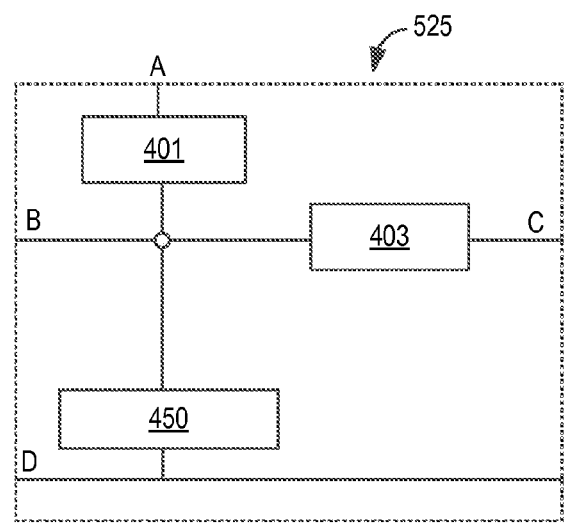
FIGS. 5-10 illustrate other exemplary post protection circuits implemented in AC direct step driver lighting system, according to some embodiments.

FIG. 5 illustrates another exemplary post protection circuit implemented in AC direct step driver lighting system, according to one embodiment. The post protection circuit 525 includes current limiting circuits 401 and 403 and a surge protection component 450. The current limiting circuit 401 reduces voltage surges appearing on the voltage input (A) to an LED load (not shown). The current limiting circuit 403 reduces the voltage surges appearing on the voltage input (C) to an LED driver (not shown). The surge protection component 450 is disposed between the rectified voltage out (B) from a rectifier (not shown) and the ground (D).

Figure 6:
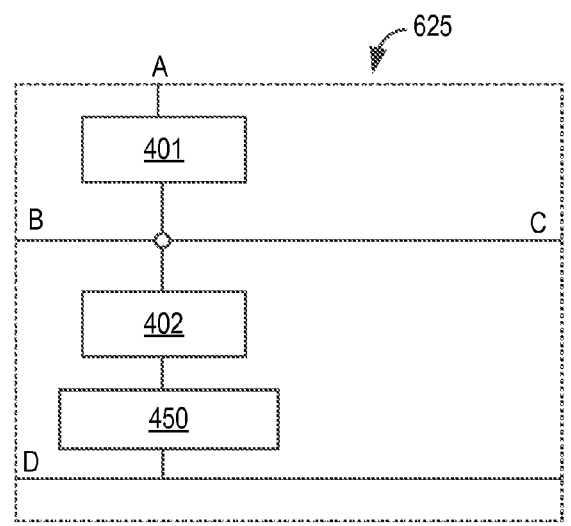

FIG. 6 illustrates another exemplary post protection circuit implemented in AC direct step driver lighting system, according to one embodiment. The post protection circuit 625 includes current limiting circuits 401 and 402 and a surge protection component 450. The current limiting circuit 401 reduces voltage surges appearing on the voltage input (A) to an LED load (not shown). The current limiting circuit 402 and the surge protection component 450 are connected in series between the rectified voltage out (B) from a rectifier (not shown) and the ground (D).

Figure 7:
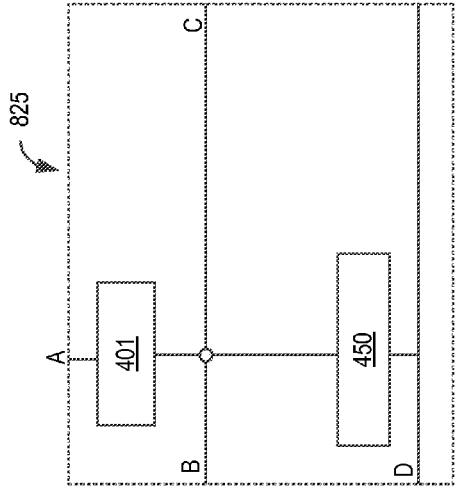

FIG. 7 illustrates another exemplary post protection circuit implemented in AC direct step driver lighting system, according to one embodiment. The post protection circuit 725 includes current limiting circuits 402 and 403 and a surge protection component 450. The current limiting circuit 403 reduces the voltage surges appearing on the voltage input (C) to an LED driver (not shown). The current limiting circuit 402 and the surge protection component 450 are connected in series between the rectified voltage out (B) from a rectifier (not shown) and the ground (D).

Figure 9:
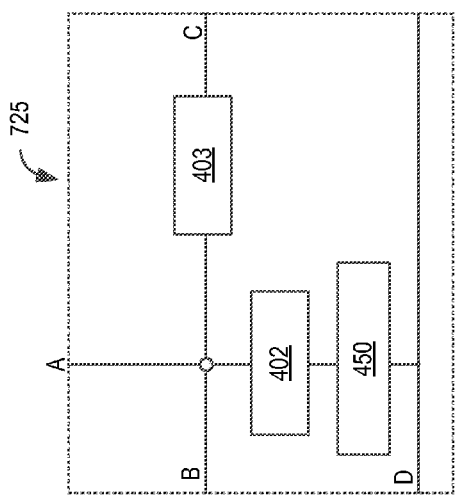
Figure 8:
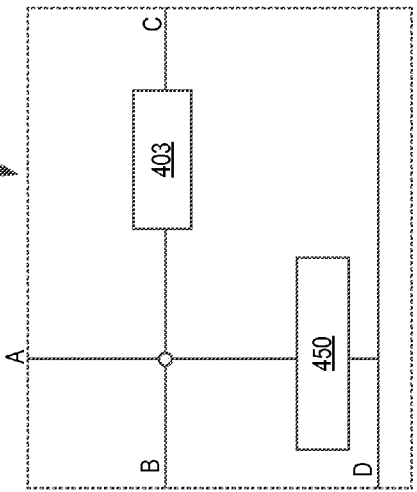
Figure 10:
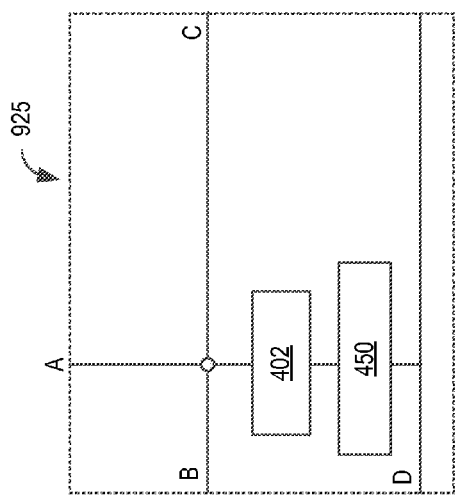

FIGS. 8-10 illustrate another exemplary post protection circuit implemented in AC direct step driver lighting system, according to one embodiment. The post protection circuit 825 shown in FIG. 8 includes a current limiting circuit 401 and a surge protection component 450. The post protection circuit 925 shown in FIG. 9 includes a current limiting circuit 402 and a surge protection component 450. The post protection circuit 1025 shown in FIG. 10 includes a current limiting circuit 403 and a surge protection component 450.

FIG. 11 illustrates an exemplary surge protection scheme implemented in an AC direct step driver lighting system, according to one embodiment. A current limiting circuit 1105 is disposed between the AC power source 110 and the surge protection circuit 215. The excessive current that flows beyond the rectifier circuit 120 is suppressed by the post protection circuit 225.

FIG. 12 illustrates another exemplary surge protection scheme implemented in an AC direct step driver lighting system, according to one embodiment. A current limiting circuit 1105 is disposed between the AC power source 110 and the surge protection circuit 215. The current limiting circuit 1105 and the surge protection circuit 215 suppress the current to an acceptable level, therefore a post protection circuit 225 may not be necessary between the rectifier circuit 120 and the LED driver 130 and the LED load 140.

Figure 13A:
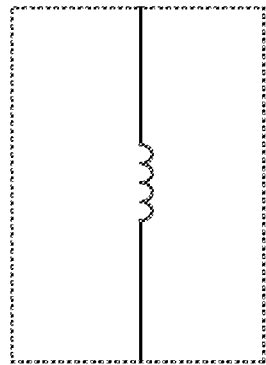
FIGS. 13A-13F illustrate various current limiting circuits suitable for an AC direct step driver lighting system, according to some embodiments.
Figure 13D:
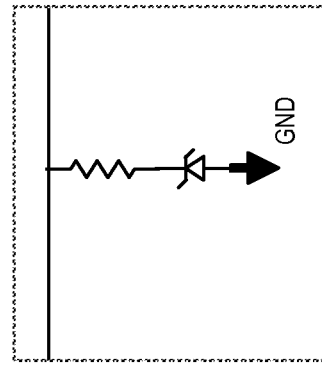
Figure 13B:
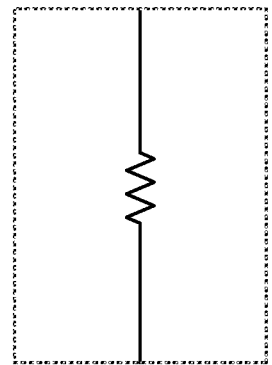
Figure 13E:
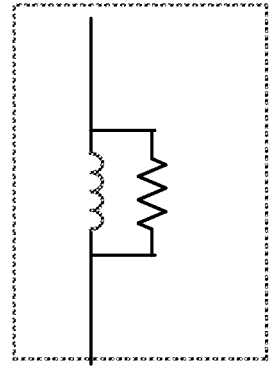
Figure 13C:
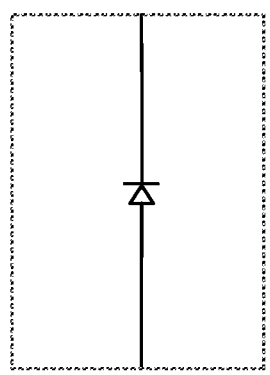
Figure 13F:
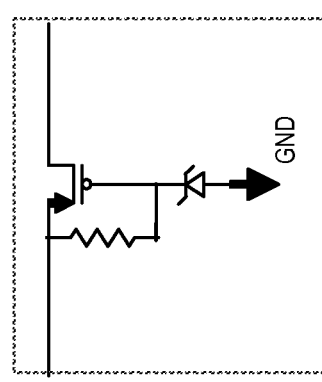

FIGS. 13A-13F illustrate various current limiting circuits suitable for an AC direct step driver lighting system, according to some embodiments. FIGS. 13A-13C respectively illustrate a diode, a resistor, and an inductor used as a current limiting circuit, for example, as shown in FIGS. 11 and 12. FIG. 13D illustrates a circuit including a high voltage MOSFET. The high voltage MOSFET reduces voltage surges that may appear on the voltage input to an LED driver or an LED load. FIG. 13E illustrates an inductor and a resistor connected in parallel. An inductor limits excessive current that flows through the current limiting circuit. The input voltage and the output voltage may vary depending on the output load condition, and the current flowing through the resistor and the inductor may be different. FIG. 13F illustrates a resistor and a TOV connected in series.

Figure 14:
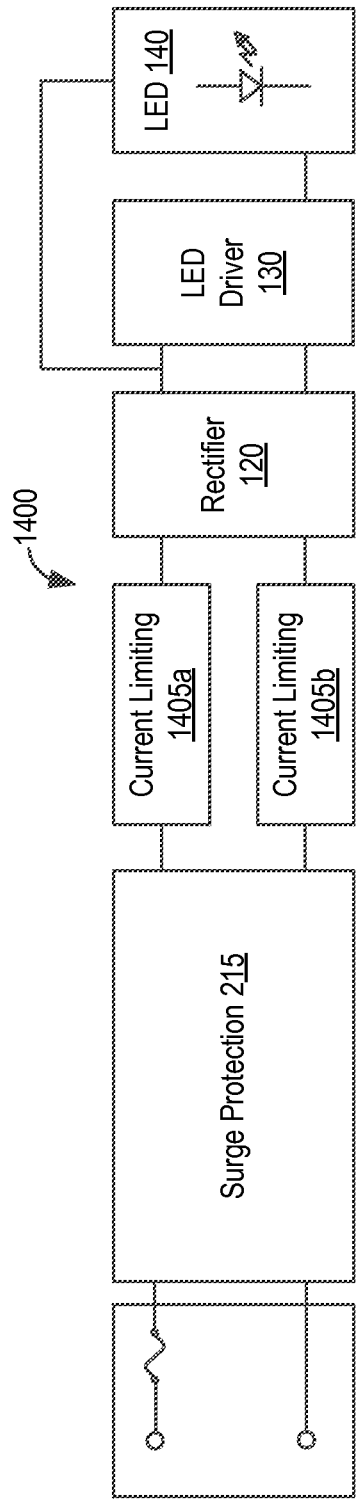

FIG. 14 illustrates an exemplary surge protection scheme implemented in an AC direct step driver lighting system, according to one embodiment. The AC direct step driver lighting system 1400 includes a surge protection circuit 215, and a post protection circuit including current limiting circuits 1405a and 1405b disposed between the surge protection circuit 215 and the rectifier 120. In one embodiment, the current limiting circuits 1405a and 1405b include a resistor and an inductor connected in parallel as shown in FIG. 13E. The surge voltage and current are prevented by the surge protection circuit 215 disposed between the AC power line and the bridge diode 1420. The surge protection circuit 215 may include a metal oxide varistor (MOV) and/or a transient-voltage-suppression (TVS) diode connected between a live wire (AC_L) and a neutral wire (AC_N) of the AC power line. Resultantly, the surge protection circuit 215 create a current path that prevents the excessive current from entering into the rectifier 120, thus protecting the LED driver 130 and the LED load 140. Other types of surge protection components/devices such as a gas discharge tube and a resistor may be used. It is also contemplated that any number or combination of MOV, TVS, gas discharge tubes, and resistors may be used in the surge protection circuit 215.

Figure 15:
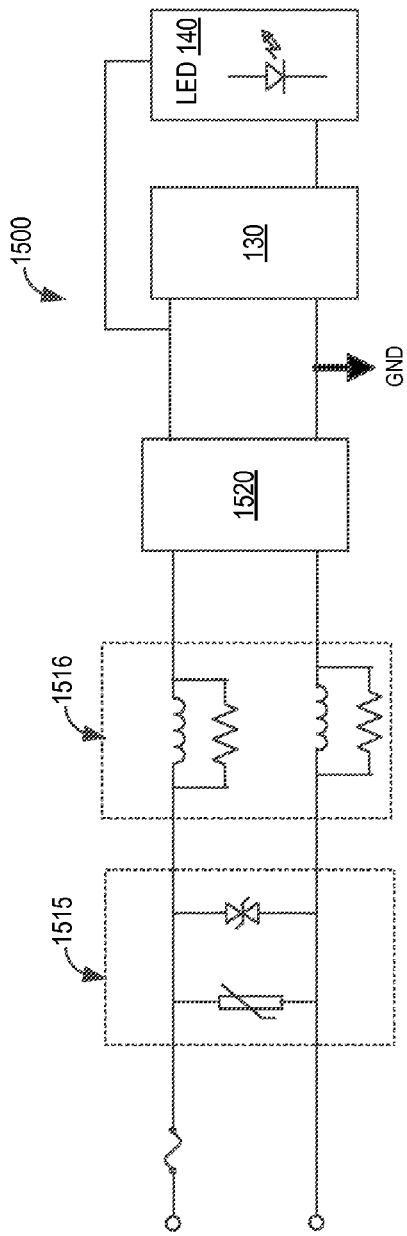

FIG. 15 illustrates another exemplary surge protection scheme implemented in an AC direct step driver lighting system, according to one embodiment. The AC direct step driver lighting system 1500 includes a surge protection circuit 1515 and a current limiting circuit 1516 disposed between the rectifier 1520 and an AC power source. In one embodiment, the surge protection circuit 1515 includes an MOV and a bidirectional TVS diode whereas the current limiting circuit 1516 disposed between the surge protection circuit 1515 and the rectifier 1520 includes an RL circuit including an inductor and a resistor connected in parallel. The RL circuit limits excessive current that flows through the current limiting circuit 1516. In one embodiment, the RL circuit is connected on a live wire of the AC power line. In another embodiment, the RL circuit is connected on a neutral wire of the AC power line.

Figure 16:
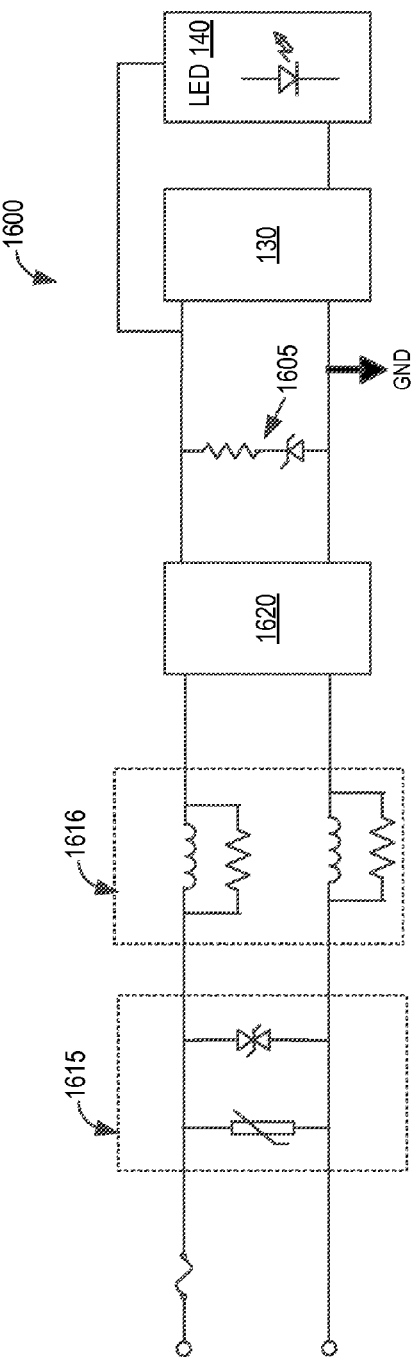

FIG. 16 illustrates another exemplary of surge protection scheme implemented in an AC direct step driver lighting system, according to one embodiment. The AC direct step driver lighting system 1600 includes a surge protection circuit 1615 and a current limiting circuit 1616 disposed between the rectifier 1620 and the AC power source. In one embodiment, the surge protection circuit 1615 includes an MOV and a bidirectional TVS diode whereas the current limiting circuit 1616 disposed between the surge protection circuit 1615 and the rectifier 1620 includes an RL circuit including an inductor and a resistor connected in parallel. In addition, a post surge protection circuit 1605 is disposed between the rectifier 1620 and the LED driver 130. For example, the post surge protection circuit 1605 includes a TVS diode and a resistor connected in series. In other examples, the post surge protection circuit 1605 may include a TVS diode alone or an MOV (not shown). It is contemplated that other types of surge protection circuits other than a TVS diode or a TVS diode and a resistor connected in series may be used.

FIG. 17 illustrates another exemplary of surge protection scheme implemented in an AC direct step driver lighting system, according to one embodiment. The AC direct step driver lighting system 1700 includes current limiting circuits 1715 and 1716 disposed between the rectifier 1720 and the AC power source. The current limiting circuit 1716 includes two MOVs and two capacitors connected in series to an earth ground. In addition, a post surge protection circuit 1705 is disposed between the rectifier 1720 and the LED driver 130. For a high voltage application over 4 kV, the post surge protection circuit 1705 may include an MOV. The current limiting circuit 1716 creates a new current path and directs excessive current to an earth ground to protect the LED driver 130 and the LED load 140.

FIG. 18 illustrates another exemplary of surge protection scheme implemented in an AC direct step driver lighting system, according to one embodiment. The AC direct step driver lighting system 1800 includes current limiting circuits 1815 and 1816 disposed between the rectifier 1820 and the AC power source. The current limiting circuit 1816 includes two capacitors connected to an earth ground. In addition, a post surge protection circuit 1805 (e.g., an MOV) is disposed between the rectifier 1820 and the LED driver 130. The current limiting circuit 1816 creates a new current path and directs excessive current to an earth ground to protect the LED driver 130 and the LED load 140.

The above exemplary embodiments illustrate various embodiments of implementing an AC lighting system including at least one of a current limiting circuit and a surge protection circuit. Various modifications and departures from the disclosed example embodiments will occur to those having ordinary skill in the art. The subject matter that is intended to be within the scope of the invention is set forth in the following claims.

We claim:

1. An alternating current (AC) lighting system comprising:
   an LED load;
   a rectifier configured to receive AC voltage from an AC power source and generate rectified AC voltage by rectifying the AC voltage from the AC power source;
   an LED driver configured to drive the LED load; and
   a surge protection circuit connected to the AC power source and the rectifier; and
   a post surge protection circuit connected to the rectifier, the LED driver, and the LED load, respectively, wherein the post surge protection circuit is configured to receive the rectified AC voltage from the rectifier and provide a first voltage to the LED load via a direct path to the LED load and a second voltage to the LED driver, wherein the post surge protection circuit comprises at least one current limiting circuit that is capable of limiting first current flowing from the rectifier to the LED load via the direct path and second current flowing from the rectifier to the LED driver.

2. The AC lighting system of claim 1, wherein the surge protection circuit is selected from a group comprising a gas discharge tube, a metal oxide varistor (MOV), a resistor, and a transient-voltage-suppression (TVS) diode.

3. The AC lighting system of claim 1, wherein the at least one current limiting circuit comprises a first current limiting circuit and a second current limiting circuit.

4. The AC lighting system of claim 3, wherein the first current limiting circuit is connected to the rectifier and the LED driver, and wherein the second current limiting circuit is connected to the rectifier and the LED load.

5. The AC lighting system of claim 4, wherein the post surge protection circuit includes a TVS diode, or a TVS diode and a resistor connected in series.

6. The AC lighting system of claim 3, further comprising a third current limiting circuit connected on a live wire of an AC power line and a fourth current limiting circuit connected on a neutral wire of the AC power line.

7. The AC lighting system of claim 6, wherein the third current limiting circuit and the fourth current limiting circuit are connected to the surge protection circuit and the rectifier.

8. The AC lighting system of claim 3, wherein the first current limiting circuit connected to the live wire comprises an inductor and a resistor connected in parallel.

9. The AC lighting system of claim 3, wherein the second current limiting circuit connected to the neutral wire comprises an inductor and a resistor connected in parallel.

10. The AC lighting system of claim 1, wherein the surge protection circuit is connected between a live wire of an AC power line and a neural wire of the AC power line.

11. The AC lighting system of claim 1, wherein the surge protection circuit further comprises a MOV and a capacitor connected in series between an AC power line and an earth ground.

12. The AC lighting system of claim 11, wherein the MOV and the capacitor are connected in series between a live wire of the AC power line and the earth ground.

13. The AC lighting system of claim 11, wherein the MOV and the capacitor are connected in series between a neutral wire of the AC power line and the earth ground.

14. The AC lighting system of claim 11, wherein the surge protection circuit creates a current path and directs excessive current to the earth ground through the current path.

15. The AC lighting system of claim 1, the post surge protection circuit includes a TVS diode, a TVS diode and a resistor connected in series, or an MOV.

16. The AC lighting system of claim 1, wherein the surge protection circuit further comprises a capacitor connected between an AC power line and an earth ground.

17. The AC lighting system of claim 16, wherein the capacitor is connected between a live wire of the AC power line and the earth ground.

18. The AC lighting system of claim 16, wherein the capacitor is connected between a neutral wire of the AC power line and the earth ground.

19. The AC lighting system of claim 16, the post surge protection circuit includes a TVS diode, a TVS diode and a resistor connected in series, or an MOV.

20. An AC lighting system comprising:
an LED load;
a rectifier configured to receive AC voltage from an AC power source and generate rectified AC voltage by rectifying the AC voltage from the AC power source;
an LED driver configured to drive the LED load;
a surge protection circuit connected to the AC power source and the rectifier;
a post surge protection circuit directly connected to the LED driver to provide a first voltage to the LED load;
a first current limiting circuit connected on a live wire of the AC power source between the surge protection circuit and the rectifier; and
a second current limiting circuit connected on a neutral wire of the AC power source between the surge protection circuit and the rectifier,
wherein the first and second current limiting circuits respectively comprise an inductor and a resistor connected in parallel.

21. A method of providing surge protection for an AC lighting system, the method comprising:
providing an LED driver for driving an LED load;
providing a surge protection circuit between a live wire and a neutral wire of an AC power line;
generating rectified AC voltage by rectifying an AC voltage from an AC power source using a rectifier;
providing a post surge protection circuit connected to the rectifier, the LED driver, and the LED load, respectively; and
limiting first current flowing from the rectifier to the LED load via a direct path to the LED load and limiting second current flowing from the rectifier to the LED driver using the post surge protection circuit.

22. The method of claim 21, wherein the surge protection circuit comprises a MOV and a capacitor connected in series between the AC power line and an earth ground.

23. The method of claim 21, wherein the post surge protection circuit comprises at least one current limiting circuit that is capable of limiting first current flowing from the rectifier to the LED load and second current flowing from the rectifier to the LED driver.

24. The method of claim 23, wherein the at least one current limiting circuit comprises a first current limiting circuit connected to the rectifier and the LED driver and a second current limiting circuit connected to the rectifier and the LED load.

* * * * *